US009268584B2

(12) United States Patent
Atchison et al.

(10) Patent No.: US 9,268,584 B2
(45) Date of Patent: *Feb. 23, 2016

(54) METHODS AND SYSTEMS FOR DYNAMICALLY MANAGING REQUESTS FOR COMPUTING CAPACITY

(71) Applicant: Amazon Technologies, Inc., Reno, NV (US)

(72) Inventors: Lee A. Atchison, Renton, WA (US); Brian A. White, Seattle, WA (US); Peter D. Cohen, Seattle, WA (US); Peter N. De Santis, Seattle, WA (US); Mikhail Garber, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 196 days.

This patent is subject to a terminal disclaimer.

(21) Appl. No.: 14/171,153

(22) Filed: Feb. 3, 2014

(65) Prior Publication Data

US 2014/0156835 A1    Jun. 5, 2014

Related U.S. Application Data

(63) Continuation of application No. 12/887,241, filed on Sep. 21, 2010, now Pat. No. 8,661,120.

(51) Int. Cl.
*G06F 9/455*    (2006.01)
*G06F 9/50*    (2006.01)
*H04L 29/08*    (2006.01)

(52) U.S. Cl.
CPC .............. *G06F 9/455* (2013.01); *G06F 9/5072* (2013.01); *G06F 9/5077* (2013.01); *G06F 9/505* (2013.01); *G06F 9/5027* (2013.01); *G06F 9/5083* (2013.01); *H04L 29/08144* (2013.01)

(58) Field of Classification Search
CPC .. G06F 9/50–9/5083; H04L 67/1002–67/1038
See application file for complete search history.

(56) References Cited

U.S. PATENT DOCUMENTS 5,546,582 A     8/1996   Brockmeyer et al.
8,661,120 B2 *  2/2014   Atchison ............... G06F 9/5072
                                                      709/217

(Continued)

FOREIGN PATENT DOCUMENTS

CN       101094158 A     12/2007
JP       H 06-202996 A    7/1994

(Continued)

OTHER PUBLICATIONS

Amazon Elastic Compute Cloud User Guide, API Version Nov. 15, 2010, 2011, pp. 1-332.

(Continued)

*Primary Examiner* — Wing F Chan
*Assistant Examiner* — Raji Krishnan
(74) *Attorney, Agent, or Firm* — Knobbe, Martens, Olson & Bear LLP

(57) ABSTRACT

Embodiments of systems and methods are described for dynamically managing requests for computing capacity from a provider of computing resources. Illustratively, the computing resources may include program execution capabilities, data storage or management capabilities, network bandwidth, etc. The systems or methods automatically allocate computing resources for execution of one or more programs associated with the user. The systems and methods may enable the user to make changes to the allocated resources after execution of the one or more programs has started.

20 Claims, 7 Drawing Sheets

(56) References Cited

U.S. PATENT DOCUMENTS

| | | | |
|---|---|---|---|
| 8,990,804 B1* | 3/2015 | Lissack | G06F 15/177 709/220 |
| 2003/0192031 A1 | 10/2003 | Srinivasan et al. | |
| 2005/0132368 A1 | 6/2005 | Sexton et al. | |
| 2006/0136897 A1 | 6/2006 | Laxminarayan et al. | |
| 2007/0078988 A1* | 4/2007 | Miloushev | G06F 9/485 709/227 |
| 2008/0059610 A1 | 3/2008 | Lin et al. | |
| 2008/0225710 A1* | 9/2008 | Raja | G06F 9/505 370/230.1 |
| 2008/0301140 A1 | 12/2008 | Alpern et al. | |
| 2009/0276771 A1* | 11/2009 | Nickolov | G06F 9/4856 717/177 |
| 2009/0300057 A1* | 12/2009 | Friedman | G06F 11/3664 |
| 2010/0180272 A1* | 7/2010 | Kettler | G06Q 30/0601 717/171 |
| 2010/0228819 A1 | 9/2010 | Wei | |
| 2011/0107406 A1* | 5/2011 | Frost | G06F 9/45558 726/6 |
| 2012/0192179 A1* | 7/2012 | Ammons | G06F 8/68 718/1 |
| 2012/0233606 A1* | 9/2012 | Amanuddin | G06F 9/45533 718/1 |
| 2013/0232484 A1* | 9/2013 | Chieu | G06F 9/45558 718/1 |
| 2014/0359618 A1* | 12/2014 | Fontignie | G06F 8/63 718/1 |
| 2015/0052527 A1* | 2/2015 | Li | G06F 9/45558 718/1 |

FOREIGN PATENT DOCUMENTS

| | | |
|---|---|---|
| JP | 2009-245409 A | 10/2009 |
| WO | WO 2007/035544 A2 | 3/2007 |
| WO | WO 2007/120663 A2 | 10/2007 |
| WO | WO 2009/097173 A1 | 8/2009 |

OTHER PUBLICATIONS

Chappell, D., A Short Introduction to Cloud Platforms, Chappell & Associates, Aug. 2008, pp. 1-13.
Chappell, D., Introducing the Windows Azure Platform, David Chappell & Associates, Dec. 2009, pp. 1-21.
Chappell, D., Introducing Windows Azure, Mar. 2009.
Chappell, D., Introducing Windows Azure, David Chappell & Associates, Dec. 2009, pp. 1-24.
Chappell, D., Windows Azure and ISVS a Guide for Decision Makers, David Chappell & Associates, Jul. 2009, pp. 1-12.
Colyer, A., Spring in Production, SpringSource, Oct. 2007, pp. 1-19.
Connolly, S., SpringSource tc Server, SpringSource, Apr. 20, 2009, pp. 1-20.
Google App Engine A Platform for Scalable Java Web Applications, Persistent Systems Ltd., 2009, 15 pages.
International Search Report and Written Opinion in corresponding International Application No. PCT/US2011/045214, dated Nov. 9, 2011, in 14 pages.
Make Web Development Faster With These Chrome Extension!, Google App Engine, 2010.
Migrating Lotus Notes Applications to Google Apps, Google, 2009, 7 pages.
Sampaleanu, C., A Guide to Migrating Enterprise Applications to Spring, SpringSource, Oct. 14, 2008, pp. 1-18.
Wolff, E., Spring: A Manager's Overview, SpringSource, 2008, pp. 1-15.

* cited by examiner

METHODS AND SYSTEMS FOR DYNAMICALLY MANAGING REQUESTS FOR COMPUTING CAPACITY

CROSS-REFERENCE TO RELATED APPLICATIONS

This application is a continuation of U.S. patent application Ser. No. 12/887,241, filed Sep. 21, 2010, entitled "Methods and Systems for Dynamically Managing Requests for Computing Capacity," which is hereby incorporated by reference herein in its entirety.

BACKGROUND

Companies and organizations operate computer networks that interconnect numerous computing systems to support their operations. The computing systems can be located in a single geographical location (e.g., as part of a local network) or located in multiple distinct geographical locations (e.g., connected via one or more private or public intermediate networks). Data centers may house significant numbers of interconnected computing systems, such as, e.g., private data centers are operated by a single organization and public data centers operated by third parties to provide computing resources to customers. Public and private data centers may provide network access, power, hardware resources (e.g., computing and storage), and secure installation facilities for hardware owned by the data center, an organization, or by other customers.

To facilitate increased utilization of data center resources, virtualization technologies may allow a single physical computing machine to host one or more instances of virtual machines that appear and operate as independent computer machines to a connected computer user. With virtualization, the single physical computing device can create, maintain or delete virtual machines in a dynamic manner. In turn, users can request computer resources from a data center and be provided with varying numbers of virtual machine resources on an "as needed" basis or at least on an "as requested" basis.

As the scale and scope of data centers has increased, provisioning, administering, and managing the physical and virtual computing resources of the data center has become increasingly complicated.

BRIEF DESCRIPTION OF THE DRAWINGS

Throughout the drawings, reference numbers may be reused to indicate correspondence between referenced elements. The drawings are provided to illustrate example embodiments described herein and are not intended to limit the scope of the disclosure.

DETAILED DESCRIPTION

Figure 1:
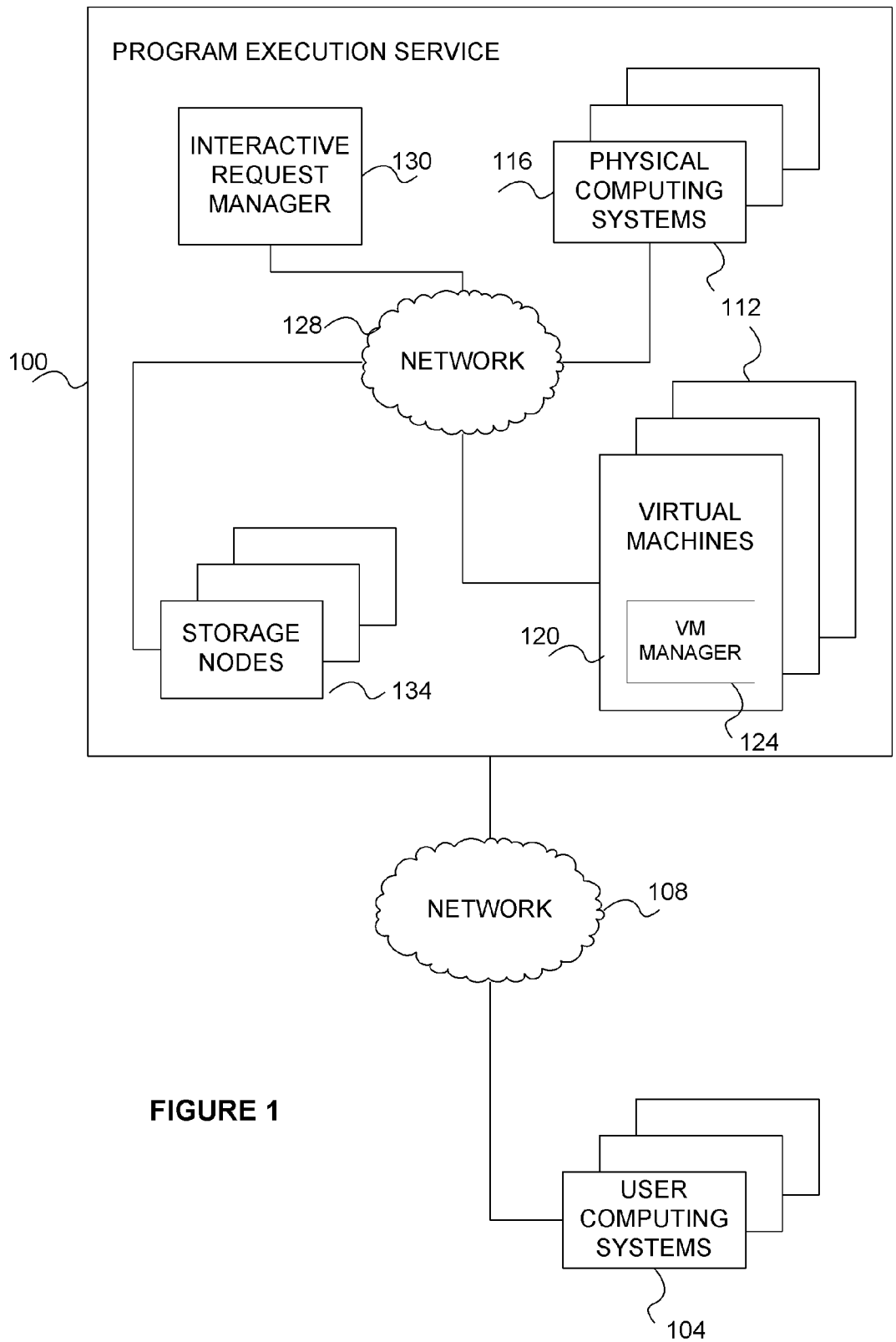
FIG. 1 is a network diagram schematically illustrating an example of a program execution service that can provide computing resources to multiple user computing systems via a communication network.

Embodiments of systems and methods are described for dynamically managing requests for computing capacity from a provider of computing resources (a program execution service). Illustratively, the computing resources may include program execution capabilities, data storage or management capabilities, database management capabilities, network bandwidth, application monitoring or logging, capabilities for taking corrective action to address problems, etc. In some implementations, a user can request that a virtualization environment be generated that can manage computer resources for the user during a current or future usage time period. For example, the user can request a virtualization environment be generated that can run the user's custom software application (s) and manage or reserve suitable program execution capacity, data storage capacity, database management options, and/or network bandwidth for the user during the usage period. The computing resource provider can determine which of the provider's computer resources can be made available to meet the user's request and can allocate those computer resources to the user during the requested usage period.

The usage period and/or other parameters of the user's request may be selected with a high degree of flexibility to meet the user's needs for the computer resources. The user's request may include one or more user-selectable parameters to specify preferences, restrictions, and/or requirements by the user. For example, the user's request can specify that a particular program (or programs) be executed during the usage period, that certain type or geographic distribution of computer resources be used during the usage period, that the usage period have a desired start date, end date, and/or duration, and so forth. In some implementations, the computing resource provider places few or no restrictions on the range of request parameters that can be submitted by a user.

As one possible example, the user may be able to request that a particular program be executed on a set of computer resources, which may include computer resources in one or more geographic locations. The user may be able to use an Application Programming Interface (API) or other type of computing interface to communicate the program and program execution parameters to the program execution service for generation of a virtualization environment. For example, the user may upload a software application using a web application archive such as a Java WAR file. The program execution service may then automatically configure a virtualization environment (e.g., an "application container"), which can be a run-time environment that includes an application software stack for the user's program together with one or more infrastructure services for executing the user's program on the program execution service. The application container can include a user-selectable operating system (e.g., Linux, Windows, etc.), application server (e.g., Apache Tomcat), system or application configuration, etc. The virtualization environment can be configured to be hosted at a specific URL. The infrastructure services can include, but are not limited to, a load balancer to distribute workload across the requested computing resources, a load scaler to scale computing resources in response to load or demand variations, a monitoring interface that permits the user to monitor execution of the program, data storage resources (e.g., scalable volume block storage), and so forth. In some embodiments, the user may be able to select one or more programs or services that can be included in the container. For example, the user may be able to select from a plurality of database models (e.g., a relational database, SQL database, Oracle database, etc.). In some embodiments, the infrastructure services can be customized to the user rather than being a shared resource among a plurality of users. For example, in some such embodiments, the load balancer can be individually customized to the user's application rather than being shared or distributed among a number of users of the program execution service.

A possible advantage of certain embodiments of the virtualization environment is that the computing system allows users to have a degree of flexibility and control over the contents of the application container, if the user so desires. For example, in some cases, the user may provide only the user's program, and the computing system may automatically manage deployment of all remaining infrastructure used by the virtualization environment. In other cases, the user may select and/or configure one or more of the infrastructure services included in the virtualization environment. In some cases, the user may select computing resources in various geographic regions in order to achieve a desired deployment topology for the user's application. The deployment topology may be configured or selected in any desired manner. For example, the deployment topology may be based on the location or region of the user's customers in order to improve performance of the application (e.g., reduced network latency). As another example, the deployment topology may be configured to use computing resources in one or more regions or zones to improve the robustness of the user's application, for instance, by improving the application's resiliency to failure of computing resources in a particular region or zone (e.g., due to adverse weather conditions in one region or zone). Also, in certain embodiments, the user retains access to the computing resources during execution of the program, and the user may take control of some or all of the computing resources during execution. For example, in some such embodiments, the user may choose to move the user's application out of the virtualization environment if the user so desires.

In certain fee-based implementations, the provider of the computer resources may charge a reservation fee to the user for the request (e.g., when the request is granted) and/or a usage fee for providing use of the available computer resources during the usage period. Various types or tiers of fee arrangements are possible. For example, computer resources may be requested for immediate user by the user ("on-demand resources"). In some such cases, the user might not pay a reservation fee but might pay higher usage fees. As another example, a user might reserve computer resources for guaranteed availability during a future usage period ("reserved resources"). The user might be charged a reservation fee for making the reservation and also charged a usage fee based on the amount of computer resources actually used during the usage period. In some such cases, the usage fee for the reserved resources may be discounted from the usage fee for on-demand resources and/or the reservation fee may be charged closer in time to the usage period rather than closer to the time the request was made. In another example, the computer resource provider may allow users to bid on unused computer resources ("spot resources"). In some such cases, the computer resource provider may set a spot price that changes based on supply and demand for the resources, and the resources may be made available to those users whose bid meets or exceeds the spot price.

Various aspects of the disclosure will now be described with regard to certain examples and embodiments, which are intended to illustrate but not to limit the disclosure.

FIG. 1 is a network diagram schematically illustrating an example of a program execution service 100 that can provide computing resources to multiple user computing systems 104 via a communication network 108. For example, the program execution service 100 can manage requests from a user to execute a program, or set of programs, on behalf of the user. At least some of the user computing systems 104 may be remote from the program execution service 100. In this example, users can use the computing systems 104 to access the program execution service 100 over the communication network 108. The network 108 may, for example, be a publicly accessible network of linked networks, possibly operated by various distinct parties, such as the Internet. In other embodiments, the network 108 may be a private network, such as, for example, a corporate or university network that is wholly or partially inaccessible to non-privileged users. In still other embodiments, the network 108 may include one or more private networks with access to and/or from the Internet.

The program execution service 100 provides a variety of functionality for managing execution of programs for multiple users. In the example illustrated in FIG. 1, the program execution service 100 comprises a plurality of computing nodes 112 that can execute programs on behalf of the users. The computing nodes 112 may comprise one or more physical computing systems 116 and/or one or more virtual machines 120 that are hosted on one or more physical computing systems. For example, a host computing system may provide multiple virtual machines 120 and include a virtual machine ("VM") manager 124 to manage those virtual machines (e.g., a hypervisor or other virtual machine monitor).

In the example illustrated in FIG. 1, each of the computing nodes 112 has some amount of computing resources available for executing one or more programs. Each computing node 112 may be configured to provide a specific amount of program execution capacity, which may be measured, for example, by a combination of one or more of processing capacity (e.g., number and/or size of processing units), memory capacity, storage capacity, network bandwidth capacity, non-network communication bandwidth, etc. In some embodiments, the program execution service 100 may provide preconfigured computing nodes 112, with each preconfigured computing node having similar and/or equivalent amounts of resources available for executing programs on behalf of users. In other embodiments, the program execution service 100 may provide a selection of various different computing nodes 112 from which a user may choose for executing programs on behalf of the user. In yet other embodiments, the program execution service 100 may generate various computing nodes that are specific to a user and execution of the user's program. In some such embodiments, the computing nodes 112 may have varying amounts and/or types of computing resources (e.g., size, speed and/or type of processing units; number of processing units; amount of memory and/or storage; platform configuration, such as 32-bit or 64-bit, operating system, etc.).

The program execution service 100 may provide user computing systems 104 with access to storage nodes 134 that provide mass storage of data, programs, and other user information. The storage nodes 134 may comprise any type of persistent data storage, for example non-volatile memory devices such as, e.g., hard disk drives, optical disk drives, etc. In the example illustrated in FIG. 1, the computing nodes 112 can access the storage nodes 134 via a network 128. The network 128 may include multiple networking devices (not shown) such as, e.g., switches, edge routers, core routers, etc. The network 128 may, but need not be, a different network than the network 108 shown in FIG. 1.

Users of the program execution service 100 can interact with the program execution service 100 via an interactive request manager 130 to request preferred and/or required resources of the program execution service (e.g., program execution capacity and/or storage resources). The interactive request manager 130 can be connected to the computing nodes 112 and the storage nodes 134 via the network 128. The interactive request manager 130 can receive requests for resources from the user computing systems 104 over the network 108. A user may request via the interactive request manager 130 that the service 100 provide one or more computing nodes for execution of a program (or programs) on behalf of the user (or other users authorized by the user). In some embodiments, the user may request via the interactive request manager 130 that the service 100 generate one or more computing nodes that can manage and reserve computing resources that may be needed for execution of a program (or programs) on behalf of the user. In various embodiments, computing resources may be specified at the time of a request for execution of programs on behalf of a user and/or at one or more other times, such as when a user registers and/or subscribes to use services of the program execution service 100. In some embodiments, the interactive request manager 130 may provide subscription and/or registration services to one or more users, such that users may specify information related to one or more programs to execute on behalf of a user (e.g., programs, source code, addressable locations of one or more programs, etc.), account information (e.g., user name, billing information, etc.), terms of use, etc. In some embodiments, after a user interacts with the interactive request manager 130 to subscribe and/or register for services, the user may be issued one or more request identifiers (e.g., keys, tokens, user names, passwords, etc.) that are associated with the user and are to be used in conjunction with executing programs on behalf of the user. In other embodiments, a module other than the interactive request manager 130 may be provided to perform various operations related to subscription and/or registration services of the program execution service 100.

In some embodiments, the interactive request manager 130 is executed or embodied by one or more physical or virtual computing systems. For example, in some embodiments, a server computing system that has components including a CPU, I/O components, storage, and memory may be used to execute the interactive request manager 130. The I/O components include a display, a network connection to the network 128, a computer-readable media drive, and other I/O devices (e.g., a keyboard, a mouse, speakers, etc.). An embodiment of the interactive request manager 130 can be stored as one or more executable program modules in the memory of the server, and the interactive request manager 130 can interact with computing nodes 112 (e.g., physical computing systems 116 and/or VMs 120) over the network 128. The interactive request manager 130 can receive requests from users for computing resources of the program execution service 100 via the network 108.

Figure 2A:
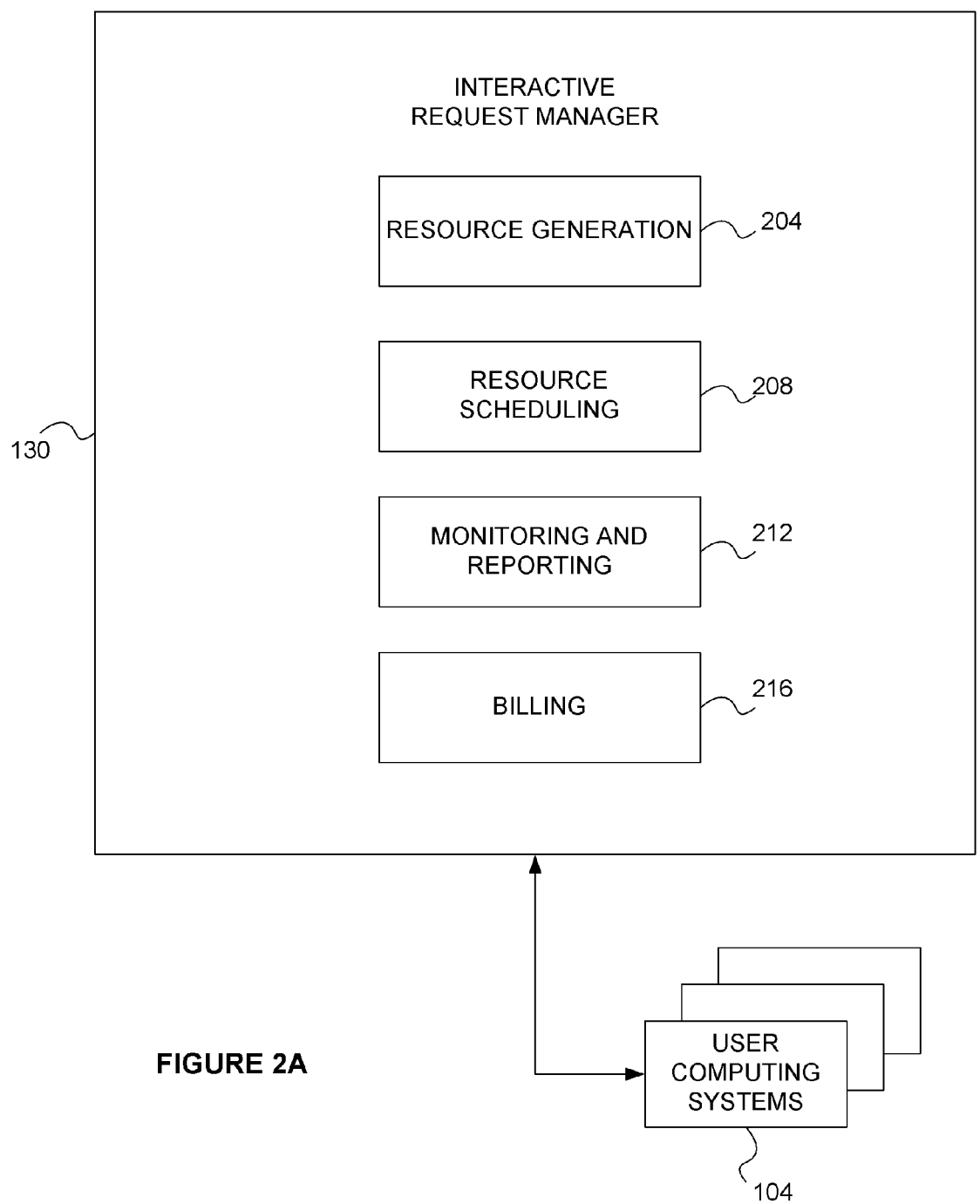
FIG. 2A is a block diagram schematic of illustrative components of an interactive request manager configured to manage requests for computing resources by users of a program execution service.

FIG. 2A is a block diagram schematic of illustrative components of an embodiment of the interactive request manager 130 that is configured for managing requests for execution of programs on behalf of users. In this embodiment, the interactive request manager includes a resource generation module 204, a resource scheduling module 208, monitoring and reporting module 212, and a billing module 216.

The resource generation module 204 receives requests from users for computing resources of the program execution service 100 such as, e.g., a request that one or more computing nodes be generated to manage and reserve available computing resources for execution of a user's program (or programs) during a usage period. The user may request that program execution computing nodes be made available immediately, may request that program execution computing nodes be generated at a future time, or may request program execution computing nodes be generated based on other criteria. Requests for program execution computing nodes may be received by the resource generation module 204 in various ways. For example, a request can be received directly from a user (e.g., via an interactive console or other GUI provided by the program execution service), from an executing program of a user that automatically initiates the execution of other programs or other instances of itself, from programming tools (e.g., command-line tools, integrated development environments (e.g., Eclipse), etc.), from a program that interacts with the interactive request manager via an Application Programming Interface ("API") provided by the program execution service (e.g., an API that uses Web services), and so forth.

Requests for computing nodes may include a number and/or type of computing nodes, a minimum and/or maximum number of computing nodes to use, a usage period during which availability of the computing nodes is to be guaranteed, an expiration time for the request, etc. The request may specify that only a certain program (or programs) be executed on the generated computing nodes during the usage period. The request for computing nodes may include other types of preferences, requirements, and/or restrictions (e.g., amount of storage capacity or network bandwidth, geographical and/or logical location for the nodes, termination criteria, etc.).

In some embodiments, the request includes the user's program (or programs), and the resource generation module 204 automatically provides infrastructure resources such that the user's program (or programs) can be executed by the program execution service 100. For example, the resource generation module 204 may automatically configure a virtualization environment that can be a run-time environment that includes an application software stack for the user's program together with one or more infrastructure services for executing the user's program. The virtualization environment can include a user-selectable operating system (e.g., Linux, Windows, etc.), application server (e.g., Apache Tomcat), and system or application configuration, etc. The virtualization environment can be configured to be hosted at a specific URL. The infrastructure services can include, but are not limited to, a load balancer to distribute workload (e.g., application traffic) across the requested computing resources, a load scaler to scale computing resources in response to load or demand variations, a monitoring interface that permits the user to monitor execution of the program, data storage resources (e.g., scalable volume block storage), and so forth. In some embodiments, the user may be able to select one or more programs or services provided by the program execution service 100 that can be included in the virtualization environment. For example, the user may be able to select from a plurality of database models (e.g., a relational database, SQL database, Oracle database, etc.). In some embodiments, the infrastructure services can be customized to the user rather than being a shared resource among a plurality of users of the program execution service 100. For example, in some such embodiments, the load balancer can be individually customized to the user's application rather than being shared or distributed among a number of users of the program execution service 100. In some embodiments, the virtualization environment can be configured to permit a user's application to spawn process threads or to open any suitable port for communication with other applications (e.g., a port other than port 80). For example, the virtualization environment may support a hypertext transfer protocol secure port (HTTPS).

A possible advantage of certain embodiments of the interactive request manager 130 is that a user may simply upload a custom application to the program execution service 100, and the interactive request manager 130 then can generate a virtualization environment that includes the resources and application stack used to execute the user's custom application on the program execution service 100. The amount of user interaction with the interactive request manager 130 needed for enabling execution of the user's program may range from relatively little interaction (e.g., little more than uploading the program using a Java WAR file) to a relatively high degree of interaction (e.g., the user may customize substantially all aspects of the virtualization environment). Accordingly, embodiments of the interactive request manager 130 may provide a relatively high degree of flexibility and customizability for the virtualization environment. In some implementations, the program execution service 100 (or other provider) makes available one or more standard or default virtualization environments for use by users of the service 100.

The request for program execution capacity may specify a usage period during which the computing resources are to be made available to the user. In some implementations, the program execution service 100 may provide a guarantee to the user that the requested computing resources will be available during the usage period. The usage period may be specified in various manners in various embodiments. For example, the usage period may indicate a specified duration of time (e.g., a number of hours, days, weeks, months, years, etc.) beginning at an initial time and ending at an expiration time. The initial time and/or expiration time may include time of day (e.g., 7:00 a.m.) and date (e.g., Jan. 23, 2010). The initial time can be at some future time, for example, one or more hours, days, weeks, or years in the future. In some cases, the future usage period may begin later than the time of the request (or confirmation of the request) by at least a certain period of time, such as, e.g., by at least one hour, one day, one week, one month, or more in the future.

In some implementations of the interactive request manager 130, a delay period may occur between a time that a request for computing nodes is received by the interactive request manager 130 and a time that the request is granted or a time that a confirmation is provided to the user. For example, the delay period may occur due to various processing operations, management operations, accounting operations, etc. performed by the interactive request manager 130 or the program execution service 100. In some such implementations, the requested usage period refers to a time period that occurs after (or substantially after) such delay periods are taken into account. For example, in certain implementations, the delay period may be seconds, minutes, or a few hours. In certain such implementations, the initial time of a requested future usage period may be a time in the future that exceeds such a delay period. The initial time in certain other implementations of the interactive request manager 130 may be the time at which the user's request is submitted, received, or granted by the program execution service 100.

In some cases, the request may indicate that the usage period is not to expire until specifically terminated by the user (e.g., there may be no set expiration time). The duration may be in a range from one hour to one week, one week to one month, one or more months, one or more years, or some other duration. In some embodiments, the usage period may include a combination of the above (or other) factors to provide the user with a high degree of flexibility in scheduling the computer resources.

In some cases, after the program service 100 generates the computing nodes that satisfy the request of the user, the user can make one or more changes to settings of the program or of the one or more computing nodes. For example, the user may change the amount or type of storage or network bandwidth associated with the one or more computing nodes, may change the usage period or termination criteria associated with the one or more computing nodes, may terminate execution of the program, etc. The user can request the one or more changes in various ways, as discussed herein. For instance, the user can request the one or more changes via a GUI, command-line tool, integrated development environment (e.g., Eclipse), API call, etc.

After the request for computing nodes is received by the resource generation module 204, the resource scheduling module 208 can schedule and allocate computing nodes to fulfill the request. For example, after receiving a request for program execution capacity, the resource scheduling module 208 may determine one or more computing nodes 112 to use for program execution. In some embodiments, the determination of the computing nodes 112 to be used is performed at the time of the request even if the request is for future availability. In other embodiments, the determination of the computing nodes is deferred to a later time such as, e.g., prior to the beginning of the usage period so that the determination can be based on information that is then available.

The resource scheduling module 208 may allocate one or more computing nodes from the computing nodes 112 for availability by the user during a requested usage period. In some embodiments, one or more specific computing nodes 112 (e.g., one or more specific physical computing nodes 116 and/or virtual computing nodes 120) are allocated for priority use by the user (or authorized users) for the entire usage period.

In other embodiments, rather than allocate specific computing nodes to a specific user for the usage period, the resource scheduling module 208 may instead allocate computing nodes from a computing node pool. The computing node pool may include an appropriate amount of computing nodes with sufficient resources to satisfy requests for program execution by the user or authorized users. In some such embodiments, after a request is received during the usage period to execute one or more programs, an appropriate amount of computing nodes sufficient to execute the one or more programs may be selected from the computing node pool, and program execution is initiated on the selected nodes. After the selected amount of computing nodes are no longer used for executing the request (e.g., after termination and/or completion of the requested execution), those computing nodes may be returned to the computing node pool for use by the user or other authorized users during the usage period. In some implementations, nodes of the computing node pool are allocated for dedicated, exclusive, or preferential use by the user (or authorized users). In some such implementations, nodes of the computing node pool that are not in use by the user (or authorized users) may be allocated to other users for program execution, and if such nodes are needed by the user (or authorized users) to fulfill the requested capacity, the other user's program can be terminated.

During the usage period, the user (or authorized users) may submit requests to the interactive request manager 130 for execution of one or more programs on the allocated computing nodes. Requests for program execution may include various information to be used in the initiation of the execution of one or more programs, such as an executable or other copy of a program to be executed, an indication of a program that was previously registered or otherwise supplied for execution, and a number of instances of the program that are to be executed simultaneously (e.g., expressed as a single desired number of instances, as a minimum and maximum number of desired instances, etc.). The request may specify a number and/or type of computing nodes for execution of a program, a minimum and/or maximum number of computing nodes to use, an expiration time for the request, a preferred execution time and/or time period of execution, etc. The request may include other types of preferences and/or requirements for execution of one or more programs (e.g., resource allocation, geographical and/or logical location for execution, proximity of execution to other programs and/or computing nodes, timing-related criteria, termination criteria, etc.).

The resource scheduling module 208 may determine which of the allocated computing nodes to use for execution of each program instance in a variety of ways, including based on any preferences, restrictions, and/or requirements specified in the request or otherwise specified for the program and/or associated user. For example, if criteria are determined for preferred and/or required resources for execution of a program instance (e.g., memory and/or storage; CPU type, cycles or other performance metric; network capacity; platform type, etc.), the determination of an appropriate computing node to execute a program instance may be based at least in part on whether a computing node has sufficient resources available to satisfy those resource criteria.

During the usage period, requests received by the resource generation module 204 to execute programs on behalf of the user or authorized users on the allocated computing nodes may result in initiation of program execution on one or more of the allocated computing nodes. In some cases, sufficient requests for program execution may be received during the usage period such that all of the allocated computing nodes are in use (e.g., executing programs). Further requests for program execution received during the usage period may be refused or may be held or queued by the resource scheduling module 208 until one or more nodes becomes available.

In some embodiments, the resource scheduling module 208 may perform one or more management operations with respect to fulfilling requests, such as, for example, enforcing usage period or other restrictions associated with requests, freeing-up computing resources to fulfill the requests, authorizing and/or authenticating the requests and/or the requesting users, etc. For example, in some cases, the request from the user may specify that only a certain user (or users) is authorized to have access to the allocated computing nodes during the usage period. In some cases, the request from the user may specify that only one or more specified programs be executed on the allocated nodes during the usage period. Other restrictions can include restrictions on duration of execution of a program, restrictions on fees incurred during execution of the program, etc. Combinations of one or more of the above restrictions (or other restrictions) may be specified by the user and checked by the interactive request manager 130 before permitting access to the allocated computing nodes.

In some implementations, after the usage period expires, the resource scheduling module 208 releases the allocated computing nodes (e.g., dedicated computing nodes or nodes in a computing node pool) for use by others. In some such implementations, programs that are executing when the usage period expires are terminated. In other implementations, such executing programs are not terminated and are allowed to continue execution until a higher priority user requests access to the computing node.

In the embodiment illustrated in FIG. 2A, the monitoring and reporting module 212 monitors and tracks usage of the allocated computing nodes during the usage period and reports information and statistics on the usage to the user. For example, the monitoring and reporting module 212 may track usage patterns of users executing programs on the allocated computing nodes. Usage patterns can include the number or identity of users accessing the nodes, the start/end times and durations of program execution, and/or other user-specified patterns or diagnostics. In some such embodiments, the monitoring and reporting module 212 may provide interactive feedback to the user including, e.g., indications of when and/or for how long programs may be likely to execute on the computing nodes, actual or predicted demand for the nodes, etc. In some embodiments, the monitoring and reporting module 212 can generate a report detailing or summarizing the usage statistics and communicate the report to the user via electronic mail or provide access to the report, usage statistics, or interactive feedback via Web services.

Some program execution services 100 may be fee-based such that the service executes programs or allocates computing resources on behalf of a user in exchange for payment of one or more fees by that user. In some fee-based services, the interactive request manager 130 may optionally include the billing module 216 schematically illustrated in FIG. 2A. For example, in some embodiments, fees may be charged to a user based on an amount and/or type of program execution capacity allocated for executing one or more programs on behalf of a user, such as based on one or more of a number of processing units, an amount of memory, an amount of storage, an amount of network resources, etc., allocated for executing programs of the user. In some embodiments, fees may be based on other factors, such as various characteristics of the computing resources used to execute programs, such as, for example, based on CPU capabilities or performance, platform type (e.g., 32-bit, 64-bit, etc.), etc. In some embodiments, fees may be charged on the basis of a variety of use factors, such as a price per use of the service, a price per unit of time that computing services are used, a price per storage used, a price per data transferred in and/or out, etc.

Fees may be based on various other factors, such as related to requests for program execution capacity and/or various properties related to executing programs (e.g., continuity of execution, fault tolerance, etc.). In at least some embodiments, a program execution service may offer one or more of various tiers, types and/or levels of services or functionality for executing programs on behalf of multiple users, and in some such embodiments, various fees may be associated with the various tiers, types and/or levels of services. The billing module 216 can monitor and track usage of the computer resources and calculate fees due for the usage.

The user may be charged a fixed fee payment (e.g., upfront or periodically billed) for reserving computing capacity and, in some cases, is charged other use fees (e.g., variable fees associated with use of various resources, such as electricity, physical rack space, network utilization, etc.). As an example, a user who makes a request for availability of computing resources during a usage period may be charged a reservation fee when the request is made or when the request is granted by the program execution service 100. The reservation fee may be based on, for example, the amount of resources requested, the start time and/or duration of the usage period, whether the service will be required to purchase additional computing hardware to fulfill the request, etc. For example, the reservation fee may be higher if the start time is in the near future than if the start time is farther out. In addition, the user (or authorized users) may be charged a usage fee for utilizing the resources during the usage period. For example, an authorized user that requests, during the usage period, execution of a program on the allocated computing nodes, may be charged a usage fee based on, for example, the duration of execution of the program, the type of the resources used to execute the program, etc. As discussed above, various types or tiers of fee arrangements are possible. For example, a user that requests on-demand resources for immediate use may not be charged a reservation fee but may be charged a higher usage fee than that charged to users that pay a reservation fee to make a reservation for resources for future usage periods.

The billing module 216 may track the usage, calculate appropriate fees, and bill the user and/or the authorized user (or provide billing information to an accounting module or service). In some cases, the request by the user may indicate that some or all of the usage fees incurred by authorized users be billed to the user rather than to the authorized users. In some such cases, the billing module 216 may appropriately portion the fees among the user and authorized users.

The interactive request manager 130 can be configured differently than illustrated in FIG. 2A. For example, various functionalities provided by the illustrated modules can be combined, rearranged, added, or deleted. In some embodiments, additional or different processors or modules may perform some or all of the functionalities described with reference to the example embodiment illustrated in FIG. 2A. Many implementation variations are possible.

Although described generally in terms of management of program execution capacity, in other embodiments, the interactive request manager 130 can be configured to manage additional or alternative types of computing-related resources for use by multiple users and to provide flexible guarantees for availability of these computing-related resources. These resources may include one or more of the following: persistent data storage capabilities (e.g., on non-volatile memory devices, such as hard disk drives); temporary data storage capabilities (e.g., on volatile memory, such as RAM); message queuing and/or passing capabilities; other types of communication capabilities (e.g., network sockets, virtual communication circuits, etc.); database management capabilities; dedicated bandwidth or other network-related resources; non-network bandwidth; input device capabilities; output device capabilities; CPU cycles or other instruction execution capabilities; etc.

Figure 2B:
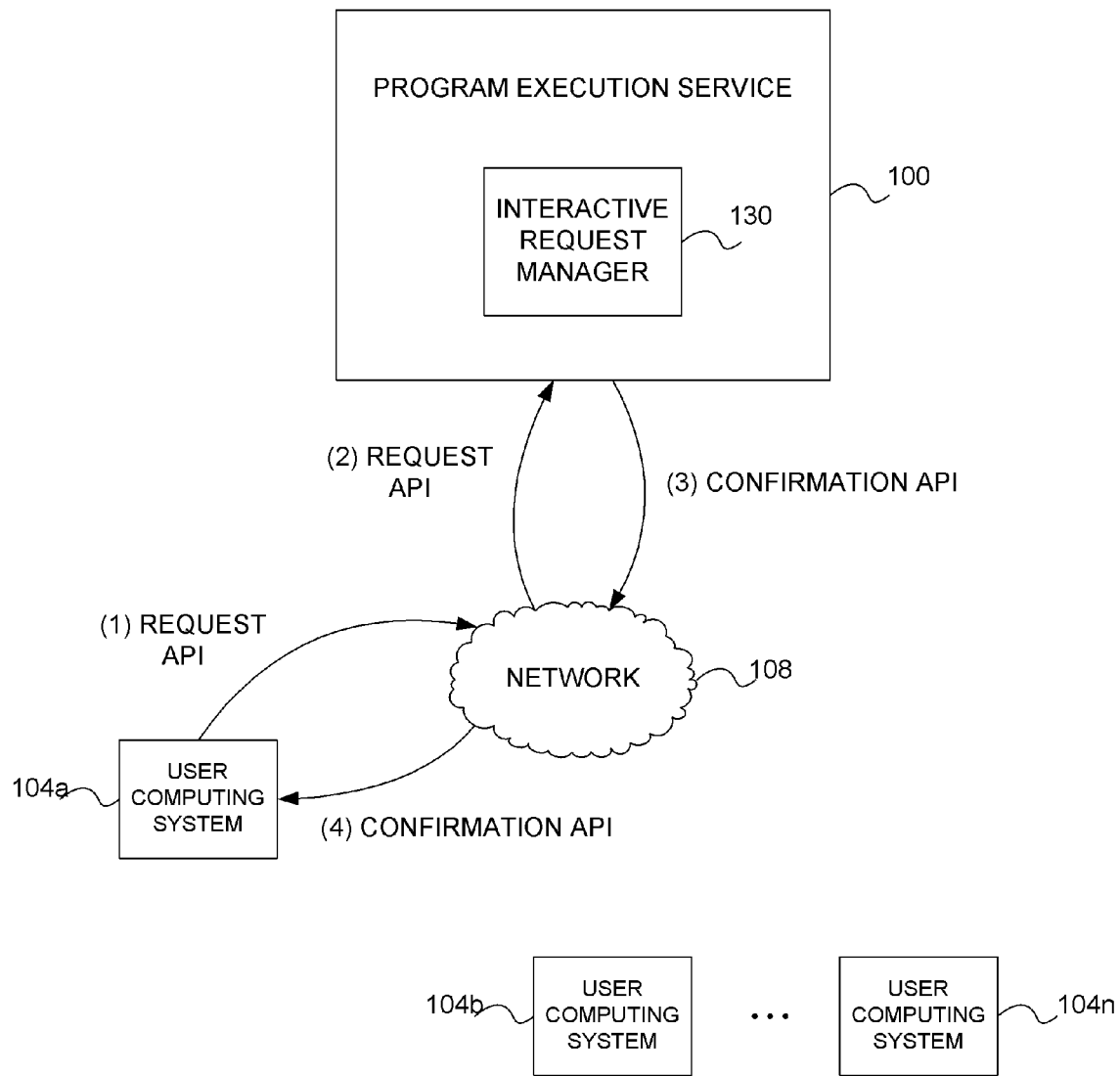
FIG. 2B is a network diagram schematically illustrating an example interaction between a user computing system and an interactive request manager of a program execution service.

FIG. 2B is a network diagram schematically illustrating an example interaction between a user computing system 104a and an interactive request manager 130 of a program execution service 100. The program execution service 100 can provide computing resources to multiple user computing systems 104a, 104b, . . . , 104n. In this illustrative example, the program execution service 100 provides an API for the user computing systems 104a, 104b, . . . , 104n to programmatically interact with the interactive request manager 130. FIG. 2B illustratively shows the user computing system 104a communicating a request for program execution on computing resources of the program execution service 100 using a request API. The request API (1) is communicated via the network 108 and (2) is received by the interactive request manager 130 of the program execution service 100. The request API can include information about the user's request such as, e.g., the user's program (e.g., an executable or other copy of a program to be executed, or an indication of a program that was previously registered or otherwise supplied for execution, etc.), the number and/or type of computing nodes, a minimum and/or maximum number of computing nodes to use, a usage period during which availability of the computing nodes is requested (or is to be guaranteed to be available), an expiration time for the request, etc. The request API can include other information about the request such as, e.g., preferences, requirements, and/or restrictions related to the user's program or the user's needs for the computing resources. For example, the request API can include information on which users are to be granted access to the computing resources during the usage period, which program (or programs) can be executed during the usage period, an amount of storage capacity or network bandwidth, geographical and/or logical location for the nodes, termination criteria, etc.

In the example shown in FIG. 2B, the interactive request manager 130 communicates a confirmation API (3) via the network 108 which is (4) received by the user computing system 104a. The confirmation API can include information related to whether the program execution service 100 can grant the request (in whole or in part) during the requested usage period (or during a different usage period). The confirmation API may also include one or more request identifiers (e.g., keys, tokens, user names, passwords, etc.) that are associated with the user's request and that are to be used in conjunction with accessing the allocated computing resources during the usage period. The confirmation API can include other information such as, e.g., information confirming that the user's preferences, requirements, and/or restrictions can be met.

FIG. 2B illustratively shows the user computing system 104a programmatically interacting via the API with the interactive request manager 130 of the program execution service 100. The program execution service 100 can receive requests for availability of the service's computing resources from other user computing systems (e.g., user computing systems 104b, . . . , 104n) via the API and can communicate confirmations to the other user computing systems via the API (such requests and confirmations are not shown in the illustrative example in FIG. 2B). The interactive request manager 130 (or other suitable component) can schedule the requests from multiple user computing systems and can allocate computing resources during the various requested usage periods. Other types of programmatic interactions (additionally or alternatively) between the program execution service 100 and the user computing systems are possible. For example, a request can be received directly from a user (e.g., via an interactive console or other GUI provided by the program execution service), from an executing program of a user that automatically initiates the execution of other programs or other instances of itself, etc.

As an additional illustrative example of the interaction between a user computing system 104a and an interactive request manager 130 of a program execution service 100, a user may request the interactive request manager 130 to generate an application container for the user's program. Using the request API (1), the user can upload a program, such as, via a Java WAR file. The user can upload the program using a web browser, command line tools, or an integrated development environment. The program may be any application desired by the user. For example, the program may be a web application. The interactive request manager 130 can then receive the program (e.g., request API (2)). The interactive request manager 30 may then process the user's request by automatically generating an application container for the user's program. The application container can comprise other services for the user to enable the user's program to be scalable and fault-tolerant. In some embodiments, the interactive request manager 30 automatically generates the application container (including infrastructure services) without further input from the user. In other embodiments, the user can choose to exert a degree of control over the generation of the application container (e.g., by selecting and/or configuring the infrastructure services included in the container). An application container can be created that generates an application stack, auto-scaling, load-balancing, versioning, storage, and/or other services on behalf of the user. For instance, the interactive request manager 130 may generate an instance of a Linux operating system, an Apache Tomcat server, an Oracle relational database, along with one or more services such as, e.g., load-balancing, monitoring, and auto-scaling for executing the user's program. The interactive request manager 130 may then confirm creation of the application container to the user via confirmation APIs (3) and (4).

After receiving the confirmation API (4), the user may make changes to the program locally. For example, the user may update and/or test the application locally using an integrated development environment and may once again send the updated program to the interactive request manager 130 (e.g., via a subsequent request API (1), (2)). The interactive request manager 130, as discussed above, may automatically generate or update the application container for the revised program (with or without further user input). After generation of the application container, the user can make changes to the services that were generated by the interactive request manager 130. The user can make these changes using a webpage, interactive console, etc. before or after execution of the user's program has begun. For example, the user may prefer a Windows operating system rather than a Linux operating system or prefer a Microsoft SQL database rather than an Oracle database and can request, e.g., using the API or an interactive console, that the interactive request manager 130 make these changes. As another example, the user may desire to change the settings for an Apache Tomcat server instance, such as a port used and request the change using, e.g., the API or the interactive console. As yet another example, the user may prefer that load-balancing be turned off and can request the interactive request manager 130 to disable load balancing. Accordingly, the user can request any kind of change desired, and the interactive request manager 130 can attempt to implement the user's desired change. The user can also share the application container with any other user. At any time, the user may also request that the user's program be deleted and the computing resources of the application container be de-allocated.

As discussed herein, the application container may also comprise monitoring services for the user's program. The monitoring services can monitor the performance of the user's program and/or the services within the application container. For instance, the monitoring services may monitor the performance of the load-balancing and/or auto scaling service or monitor the performance of the server. The monitoring services may provide a report of the performance to the user. The monitoring services can also take corrective action if any problem arises during execution of the user's program. For example, if the monitoring services detect that the user's program is not responding (e.g., one or more computing nodes have failed), then the monitoring services can restart the one or more computing nodes and/or request additional computing nodes to take over for failed nodes. As another example, if the demand for the user's application increases such that there is a risk of affecting performance of the user's program, the monitoring services can allocation additional computing resources on behalf of the user's program and/or notify the user of the allocation. The user can specify to the interactive request manager 130 how or when to be notified. For instance, the user may specify using an API or an interactive console that the interactive request manager 130 communicate an electronic mail message to the user when any error occurs. As another example, the user may specify that the interactive request manager 130 communicate the electronic mail message to the user about any error and receive authorization from the user before taking any corrective action. The user can configure the notification settings in any way desired. The foregoing are intended as illustrative examples of the types of interaction between a user and various embodiments of the interactive request manager 130 and are not intended to be limiting.

Figure 3A:
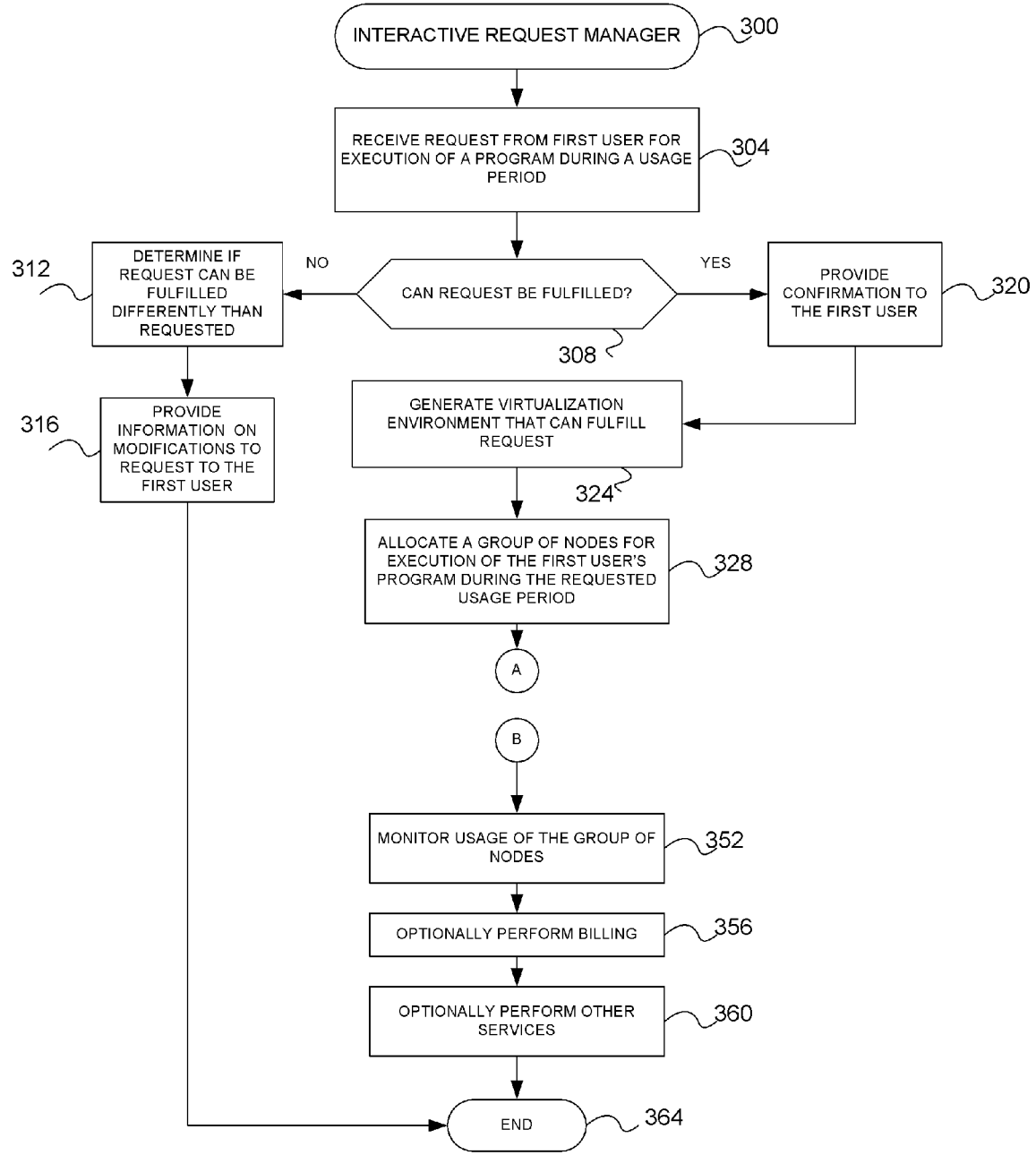
FIGS. 3A and 3B are flow diagrams illustrating an interactive request manager routine implemented by an interactive request manager component.
Figure 3B:
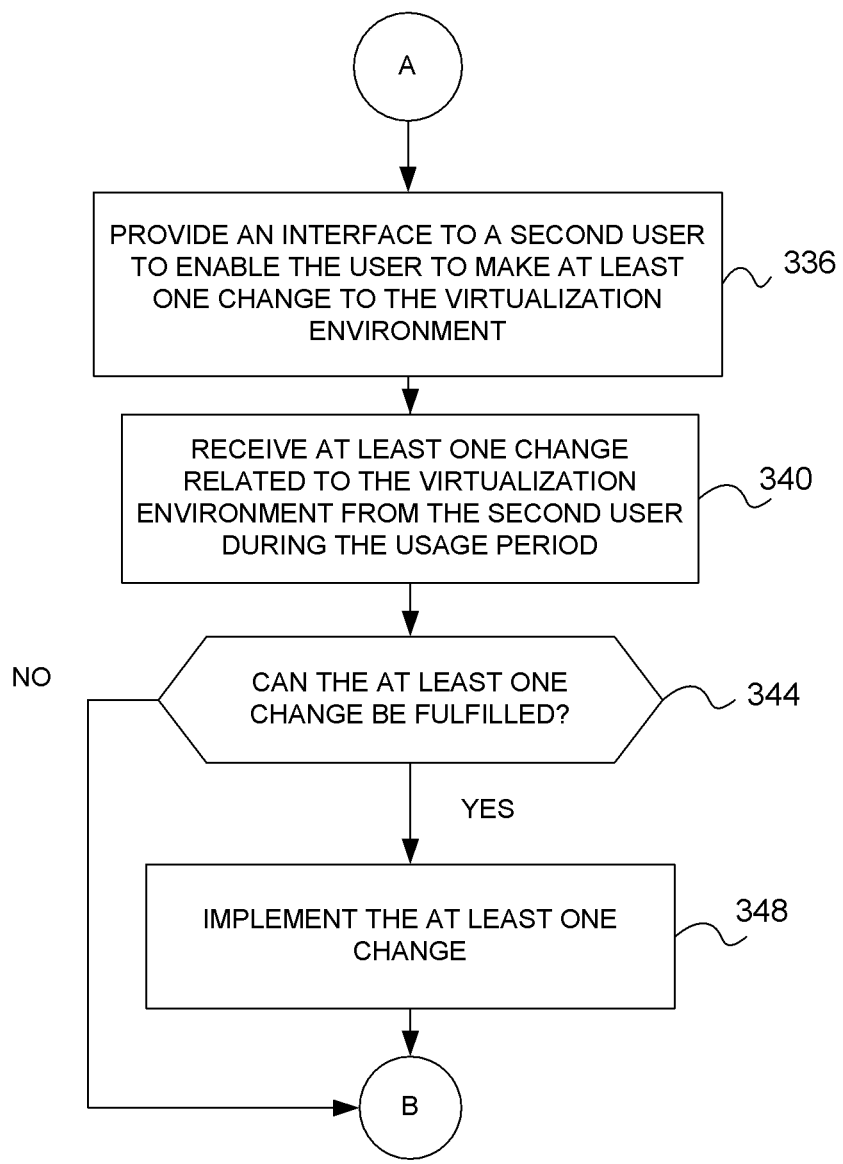

FIGS. 3A and 3B are flow diagrams that schematically illustrate an example embodiment of an interactive request manager routine 300. In some implementations, the routine 300 can be provided by embodiments of the interactive request manager 130 of the program execution service 100 described with reference to FIGS. 1 and 2. The example routine 300 is described in terms of a first user that makes a request for program execution capacity, e.g., a program to execute on one or more computing nodes of the program execution service, during a usage period (see, e.g., FIG. 3A), and a second user that requests changes to program execution capacity during the usage period (see, e.g., FIG. 3B). As will be discussed below, the first user and the second user need not be different users and may refer to the same user. The example routine 300 is intended to illustrate, but not to limit, various aspects of the interactive request manager 130.

With reference to FIG. 3A, at block 304, a request is received by the interactive request manager 130 from the first user for execution of a program (or programs) by the program execution service 100 during a usage period. As discussed above, the request may include the program(s), a number and/or type of computing nodes, a minimum and/or maximum number of computing nodes to use, a future usage period during which availability of the computing nodes is to be guaranteed, an expiration time for the request, etc. The request may specify that only a certain user (or users) be granted access to the computing nodes during the usage period or that only a certain program (or programs) be executed on the computing nodes during the usage period. The request for computing resources may include other types of preferences, requirements, and/or restrictions (e.g., amount of memory or storage capacity, network bandwidth, geographical and/or logical location for the nodes, termination criteria, etc.).

At block 308, the interactive request manager 130 determines whether the request can be fulfilled. For example, in some cases, the program execution service 100 may have sufficient capacity to meet the request or the usage period is sufficiently far in the future that additional computing resources can be acquired (if needed). If the request can be fulfilled, at block 320 confirmation that the request can be fulfilled is provided to the first user. For example, a message may be communicated to the first user via electronic mail, or the program execution service may provide the confirmation via Web services or via an interactive console or other GUI provided by the program execution service. The confirmation may be provided via a confirmation API as discussed with reference to FIG. 2B.

If the request cannot be fulfilled, in whole or in part, the routine 300 continues to block 312 where the interactive request manager attempts to determine whether the request can be fulfilled, in whole or in part, differently than requested.

For example, the routine 300 may determine that the request can be fulfilled during a different usage period or that the request can be fulfilled in part (e.g., with fewer nodes than requested) during the requested usage period. In some cases, the routine 300 at block 312 may determine that the request can be fulfilled during the requested usage period contingent on one or more additional events. For example, the routine 300 may determine that the request can be fulfilled contingent on sufficient additional computing resources being acquired by the program execution service and contingent on those additional resources being delivered and installed prior to the beginning of the requested usage period. At block 316, the routine 300 provides information to the first user regarding one or more possible modifications or contingencies related to the request and then the routine 300 ends. For example, a message may be communicated to the first user via electronic mail, or the program execution service may provide the information via Web services or via an interactive console or other GUI provided by the program execution service. The information may be provided via an API (see, e.g., FIG. 2B). The first user can use the information on the possible modifications or contingencies related to the request and then resubmit a new request if desired.

In the illustrated embodiment, if the request can be fulfilled, the routine 300 continues to block 324 where the interactive request manager generates a virtualization environment (e.g., an application container) that includes the user's program and suitable infrastructure for executing the program on the program execution service. The interactive request manager determines a group of computing nodes that can execute the virtualization environment. In some implementations, the user may request a particular number, geographic distribution, etc. for the computing nodes to be used for execution of the program. The number (and/or geographic distribution) of computing nodes in the group of computing nodes may, but need not, be different from the number of computing nodes requested by the user. For example, the number of computing nodes in the group may be less than the requested number, because the program execution service has sufficient excess computing capacity in the event that the number of computing nodes actually requested during the usage period is greater than the number of computing nodes in the group. In other cases, the number of computing nodes in the group may be greater than the number requested to attempt to ensure that there will be enough computing nodes to safely meet anticipated demand during the usage period (e.g., to provide reserve nodes in case of failure of one or more of the computing nodes in the group). In various embodiments, the user can make one or more changes to the settings associated with the virtualization environment or the group of nodes (e.g., amount or type of storage capacity or network bandwidth, geographical and/or logical location for the nodes, termination criteria, etc.). The routine 300 can verify that the one or more changes can be fulfilled or satisfied. At block 328, the group of computing nodes is allocated for availability of the first user during the usage period. As discussed above with reference to the resource scheduling module 208, the allocated group of computing nodes may comprise specific computing nodes or nodes selected from a computing node pool.

With reference to FIG. 3B, during the usage period, a second user may make one or more changes associated with execution of the first user's program (or programs) on the computing nodes that have been allocated to the first user. As noted above, the second user may, but need not be, different from the first user. In one example scenario, the first user may have requested execution of the program. During the usage period, the first user might submit one or more changes to the settings for the program executing on the computing nodes. In this example scenario, the second user would be the same as the first user. In some such scenarios, the request by the first user might indicate that only the first user (and no other users) can make changes to the program execution or the allocated computing nodes.

In other example scenarios, the second user may be a different user than the first user. For example, the request by the first user may indicate that a specific second user (or second users) is authorized to make changes with respect to the program executing on the computing nodes during the usage period. In this example scenario, the second user (or second users) can be different users than the first user. For example, the first user may be an application developer who initially uploaded and requested program execution capacity, and the second user may be a network administrator or application development administrator who monitors ongoing execution of the program.

In another example scenario, the request by the first user might indicate that any user of the program execution service 100 can make changes to the program execution during the usage period as long as such a (second) user submits the proper identifier information. In such a scenario, the first user might communicate an identifier (e.g., a key, token, password, etc.) to various second users. Any of these second users would then use the program identifier in making a request for making changes during the usage period. In some such scenarios, if a user requested changes to the program executing on the allocated computing nodes but did not have (or did not submit with the request) the program identifier, the interactive request manager would deny the request.

At block 336, the interactive request manager can provide an interface to the second user to enable the second user to request one or more changes to the virtualization environment provided for execution of the program on the computing nodes. As discussed above, the interface can be provided in a variety of ways. For example, the interface could be provided through via an interactive console or other GUI, a command-line tool, a webpage, and integrated development environment, etc. At block 340 the request for changes from the second user is received by the interactive request manager. For example, the request may be to terminate an executing instance of the program, launch one or more new instances to execute the program, to modify run-time settings of one or more of the instances, etc. As discussed above, request may be to make changes to the allocated computing nodes such as, e.g., type or amount of resource allocation, geographical and/or logical location for execution, timing-related criteria, termination criteria, etc.

At block 344, the interactive request manager determines whether the change request from the second user can be granted or fulfilled. For example, the first user's request may have specified one or more requirements or restrictions to be placed on changes that could be made to the computing nodes, and if the second user's request does not satisfy some or all of the requirements or restrictions, the second user's request may be denied. In other cases, changes to the computing nodes may require additional resources or computation nodes, so that the second user's request cannot be fulfilled at the time of the second user's request. In such a situation, in various embodiments, the interactive request manager may deny the second user's request or may hold or queue the second user's request until sufficient computing nodes can be generated for use by the second user. In some implementations, the interactive request manager may provide information to the second user on an estimated time when the request can be fulfilled, how the request can be modified so that the request can be immediately fulfilled, etc.

At block 348, if the program execution request from the second user can be fulfilled, the program execution service implements the one or more changes on the computing node or nodes that may be executing the program or programs of the first user.

With reference to FIG. 3A, the routine 300 continues at block 352 where the interactive request manager monitors and tracks usage of the program execution on the group of nodes allocated for program execution. As discussed with reference to the monitoring and reporting module 212, the interactive request manager monitor usage patterns of users (e.g., the first user) executing programs on the allocated computing nodes. Usage patterns can include the number or identity of users making changes to the allocated nodes, the start/end times and durations of program execution, and/or other user-specified patterns or diagnostics. In some embodiments, at block 352 interactive feedback may be provided to the first user or the second user including, e.g., indications of when and/or for how long programs may be likely to execute on the allocated computing nodes, actual or predicted demand for the nodes, etc. In some embodiments, a report can be generated detailing or summarizing the usage statistics and provided to the first user via electronic mail or via an interactive console or other GUI provided by the program execution service.

In embodiments in which the program execution service is fee-based, at block 356 the interactive request manager (or other accounting or billing manager) can calculate one or more fees. For example, the first user may be charged a reservation fee for requesting the computing capacity, and the first user or the second user may be charged a usage fee for program execution on the allocated nodes during the usage period.

At block 360, optionally other services can be performed by embodiments of the routine 300. For example, various housekeeping operations may be performed including freeing the computing nodes for use by others after the expiration of the usage period. The routine 300 then continues to block 364 and ends.

Figure 3C:
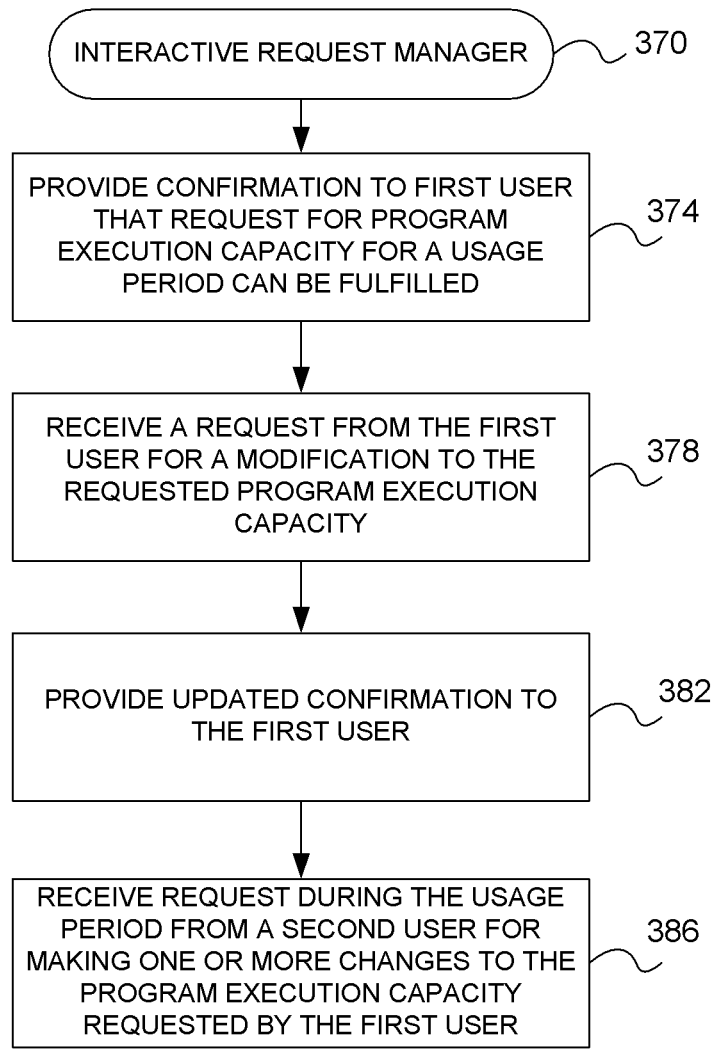
FIG. 3C is a flow diagram that schematically illustrates an example of a routine by which an embodiment of an interactive request manager can communicate with a user computing system for modifying a setting of allocated computing resources.

FIG. 3C is a flow diagram that schematically illustrates an example of a routine 370 by which an embodiment of an interactive request manager can communicate with a user computing system for confirming requests for computing resources. In some implementations, the routine 370 can be implemented by embodiments of the interactive request manager 130 of the program execution service 100 described with reference to FIGS. 1 and 2. As discussed with reference to blocks 304 and 308 of FIG. 3A, the interactive request manager can receive a request from a first user for program execution capacity for a usage period and can determine whether the request for the program execution capacity can be fulfilled.

Continuing at block 374 of FIG. 3C, if the request can be fulfilled, the interactive request manager provides a confirmation to the first user. For example, as discussed with reference to FIG. 2B and block 320 of FIG. 3A, the confirmation can include information related to whether the program execution service can grant the request (in whole or in part) during the requested usage period (or during a different usage period). The confirmation may also include one or more request identifiers (e.g., keys, tokens, user names, passwords, etc.) that are associated with the first user's request and that are to be used in conjunction with making changes to the computing resources during the usage period. The confirmation can include other information such as, e.g., information confirming that the user's preferences, requirements, and/or restrictions can be met. In some implementations, the confirmation is communicated via a confirmation API (see, e.g., FIG. 2B).

In some cases, the program execution requirements of the first user may change between the time the request is confirmed (at block 374) and the beginning of the usage period. In some such cases, the first user may submit a modification of the request to the interactive request manager. For example, the modified request may include information on a modified program to be executed, a modified number of computing nodes or settings associated with the computing nodes, a modified start time, termination time, and/or duration of the usage period, or changes in other preferences or requirements of the first user. The modified request may be to cancel the initial request, in whole or in part. Accordingly, in such cases, at block 378 the interactive request manager may receive the modified request from the first user and determine whether the modified request can be fulfilled (in whole or in part).

At block 382, the interactive request manager provides an updated confirmation to the first user, which can include information related to whether the program execution service can grant the modified request (in whole or in part) during the requested usage period (which may have been modified in the modified request) or whether the program execution service can grant the modified request (in whole or in part) during a different usage period. The updated confirmation may also include one or more updated request identifiers (e.g., keys, tokens, user names, passwords, etc.) that are associated with the first user's modified request and that are to be used in conjunction with making one or more changes to the computing resources during the (possibly updated) future usage period. The updated confirmation can include other information such as, e.g., information confirming that the user's (possibly updated) preferences, requirements, and/or restrictions can be met. In some implementations, the updated confirmation is communicated to the first user via a confirmation API (see, e.g., FIG. 2B).

At block 386, the interactive request manager can receive a request during the usage period from a second user for making one or more changes to the computing capacity allocated to the first user. The interactive request manager may process the request from the second user generally as described with reference to FIG. 3B. For example, in some implementations, the request received from the second user may include the request identifier for the allocated computing capacity that was communicated to the first user at block 374 (and/or at block 382 if a modified request was received from the first user).

Figure 4:
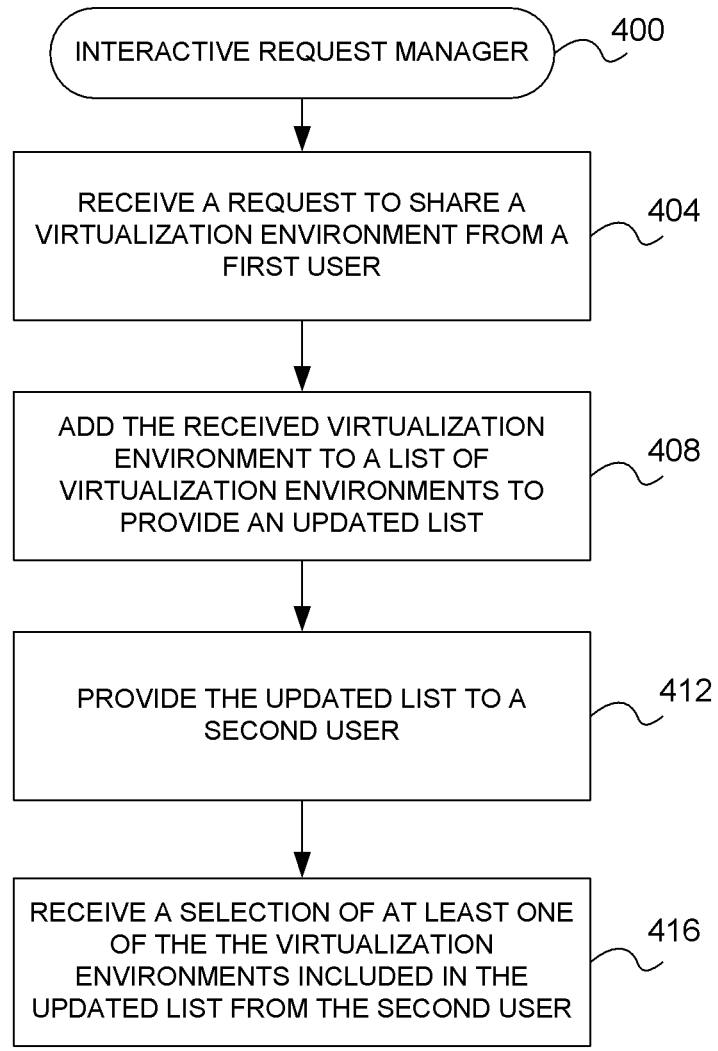
FIG. 4 is a flow diagram that schematically illustrates an example of a routine by which an embodiment of an interactive request manager can communicate with a user computing system to provide a plurality of virtualization environments for selection by a user.

FIG. 4 is a flow diagram that schematically illustrates an example of a routine 400 by which an embodiment of an interactive request manager can communicate with a user computing system for providing a plurality of virtualization environments (e.g., application containers) for selection by the user. In some implementations, the routine 400 can be implemented by embodiments of the interactive request manager 130 of the program execution service 100 described with reference to FIGS. 1 and 2. As discussed with reference to blocks 340 of FIG. 3B, the interactive request manager can be configured to receive at least one change related to a virtualization environment generated for a user.

Continuing at block 404 of FIG. 4, the interactive request manager receives from a first user a request to share a virtualization environment. For example, after the interactive request manager has generated a virtualization environment for the first user, the first user may decide to share the virtualization environment with other users. To enable the sharing of the virtualization environment, the first user may communicate a request for sharing the virtualization environment to the interactive request manager. The request may specify which virtualization environments are to be shared. In some implementations, the request is communicated via a request API (see, e.g., FIG. 2B).

At block 408 of the example routine 400, the interactive request manager adds the virtualization environment(s) to a list of virtualization environments to create an updated list of virtualization environments. The updated list may include a list of the virtualization environments that may be provided to other users of the program execution service. In some cases, the updated list may include virtualization environments provided by not only the first user but also by the program execution service and/or by other users of the program execution service. Some of the virtualization environments may be provided free of charge to user, and other environments may be made available for a fee. The updated list may include, for example, descriptions of the virtualization environments, name(s) of the user(s) that generated the virtualization environments, a fee for using the virtualization environments, recommendations on the type of applications suitable for use with the virtualization environment, links to similar or related virtualization environments, statistics related to the performance of the virtualization environments, settings for attributes of the virtualization environments, etc. In some implementations, after the interactive request manager creates an updated list, a confirmation is communicated to the first user via a confirmation API (see, e.g., FIG. 2B).

At block 412, the interactive request manager may provide the updated list of application containers to a second user of the program execution service. The second user can be the same or different from the first user. In some implementations, the interactive request manager provides the updated list to the second user via a web interface, GUI, API call, etc. For example, the second user may request the interactive request manager to execute a program during a usage period (see, e.g., FIG. 3A). During the request process, the interactive request manager may provide the updated list of virtualization environments so that the second user can request which virtualization environment should be used for execution of the second user's application. In some implementations, the second user may provide one or more preferences or requirements for execution of the second user's application, and the interactive request manager may recommend one or more virtualization environments that meet some or all of the second user's preferences or requirements. For example, the second user may indicate an expected demand for the second user's application, geographic location of the user's customers, desired program execution capacity (e.g., CPU, memory, storage, bandwidth, etc.), and so forth. The interactive request manager may identify one or more virtualization environments that match some or all of the second user's preferences and provide this recommendation to the second user. In some cases, the interactive request manager may rank or sort the recommended virtualization environments in terms of likelihood of meeting the second user's preferences or requirements.

At block 412 of the example routine 400, the interactive request manager may receive from the second user a selection of at least one of the virtualization environments included in the updated list. In some implementations, the second user may make at least one change to the one or more virtualization environments before or after selection. For example, the second user may change one or more settings of a particular virtualization environment before providing information regarding the second user's selection to the interactive request manager. The interactive request manager may then execute an instance of the second user's application using the selected virtualization environment(s) (see, e.g., FIG. 3A).

In some embodiments, after the second user has selected at least one of the virtualization environments, a fee may be provided to the first user who provided a selected virtualization environment. For example, the second user may be charged one or more fees, as discussed above, for execution of the user's application using the at least one selected virtualization environment (e.g., a reservation fee, a usage fee, etc.). A portion of one or more of the fees may be provided to the first user. For example, the provided fee may be a fixed fee or a percentage of some or all of the fees charged to the second user. The provided fee may also be a tiered fee based on the number of changes the second user has made to the at least one selected virtualization environment, the number of users that have selected a particular virtualization environment, the duration of time a particular virtualization environment has existed or is used, etc.

In some implementations of the example routine 400, the second user may choose to make changes to a selected virtualization environment. For example, the first user may have provided a virtualization environment based on, e.g., Java, and the second user may modify the environment such that it is based on another programming language (e.g., Ruby). The second user may choose to share, with other users of the program execution service, the modified virtualization environment that includes the changes made by the second user. The second user may request that interactive request manager share this virtualization environment with other users (see, e.g., block 404) and (optionally) be provided a fee for its use. For example, a third user may select the first user's virtualization environment, the second user's modified version of the first user's virtualization environment, and/or a virtualization environment provided by the program execution service and/or by other users. Accordingly, a marketplace that includes a wide variety of virtualization environments (free and/or fee-based) may be developed and made available to users of the program execution service.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The systems and modules may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to, or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
   a memory storing an interactive request manager component in the form of computer executable instructions, wherein the interactive request manager is configured to manage requests for computing resources by users of a program execution service (PES), and wherein the PES provides a plurality of computing nodes that are each configurable to execute one or more programs of multiple users of the PES, the program services comprising (1) to allow a user to customize distribution of a workload across multiple computing nodes of the plurality of computing nodes and (2) a load scaler configured to scale computing resources in response to variations in workload; and
   a processing unit coupled to the memory, the processing unit programmed by the interactive request manager component to at least:
      receive a request from a first user to share, with users of the PES, a first virtualization environment generated for the first user, the first virtualization environment including an operating system, at least one user program for execution on a subset of the plurality of computing nodes, the load balancer, and the load scaler;
      update a list of virtualization environments available for selection by users of the PES to provide an updated list of virtualization environments that includes information related to the first virtualization environment;
      provide the updated list of virtualization environments to users of the PES;
      receive a selection of the first virtualization environment that is included in the updated list from a second user of the PES; and
      generate a second virtualization environment for the second user, the second virtualization environment based at least in part on the first virtualization environment.

2. The system of claim 1, wherein the processing unit is further programmed by the interactive request manager component to receive from the second user at least one change that is to be made to the first virtualization environment, and to generate the second virtualization environment based at least in part on the at least one change.

3. The system of claim 2, wherein the processing unit is further programmed by the interactive request manager component to receive a request from the second user to share, with users of the PES, the second virtualization environment generated for the second user, and to further update the updated list to include information related to the second virtualization environment.

4. The system of claim 3, wherein the processing unit is further programmed by the interactive request manager component to receive from a third user a selection of the first virtualization environment or the second virtualization environment.

5. The system of claim 1, wherein the processing unit is further programmed by the interactive request manager component to execute an application provided by the second user using the second virtualization environment.

6. The system of claim 1, wherein the processing unit is further programmed by the interactive request manager component to recommend at least one virtualization environment included in the updated list of virtualization environments to the second user.

7. The system of claim 6, wherein the at least one recommended virtualization environment is based at least in part on preferences provided by the second user.

8. The system of claim 1, wherein the processing unit is further programmed by the interactive request manager component to provide the first user with a fee based at least in part on the selection of the first virtualization environment by the second user.

9. The system of claim 1, wherein the PES further comprises one or more of: (1) a monitoring interface configured to allow the user to monitor execution of the at least one user program, or (2) a plurality of database management services.

10. A computer-implemented method for dynamically managing requests for computing capacity provided by a program execution service (PES), the method comprising:
   under control of the PES that provides a plurality of computing nodes that are each configurable to execute one or more programs of multiple users of the PES, the PES further providing a plurality of user-customizable program services, the program services comprising (1) a load balancer configured to allow a user to customize distribution of a workload across multiple computing nodes of the plurality of computing nodes and (2) a load scaler configured to scale computing resources in response to variations in workload:

receiving a request from a first user to share, with users of the PES, a first virtualization environment generated for the first user, the first virtualization environment including an operating system, at least one user program for execution on a subset of the plurality of computing nodes, the load balancer and the load scaler;

updating a list of virtualization environments available for selection by users of the PES to provide an updated list of virtualization environments that includes information related to the first virtualization environment;

providing the updated list of virtualization environments to users of the PES;

receiving a selection of the first virtualization environment that is included in the updated list from a second user of the PES; and generating a second virtualization environment for the second user, the second virtualization environment based at least in part on the first virtualization environment.

11. The method of claim 10, further comprising receiving from the second user at least one change that is to be made to the first virtualization environment, and to generate the second virtualization environment based at least in part on the at least one change.

12. The method of claim 11, further comprising receiving a request from the second user to share, with users of the PES, the second virtualization environment generated for the second user, and to further update the updated list to include information related to the second virtualization environment.

13. The method of claim 12, further comprising receiving from a third user a selection of the first virtualization environment or the second virtualization environment.

14. The method of claim 10, further comprising executing an application provided by the second user using the second virtualization environment.

15. The method of claim 10, further comprising recommending at least one virtualization environment included in the updated list of virtualization environments to the second user.

16. The method of claim 15, wherein the at least one recommended virtualization environment is based at least in part on preferences provided by the second user.

17. The method of claim 10, further comprising providing the first user with a fee based at least in part on the selection of the first virtualization environment by the second user.

18. The method of claim 10, wherein the PES further comprises one or more of: (1) a monitoring interface configured to allow the user to monitor execution of the at least one user program, or (2) a plurality of database management services.

19. Non-transitory physical computer storage comprising computer-executable instructions that, when executed by a computing system, direct the computing system to perform operations comprising:

receiving a request from a first user to share, with users of a program execution service (PES), a first virtualization environment generated for the first user, the first virtualization environment including an operating system, at least one user program for execution on a subset of a plurality of computing nodes, a load balancer provided by the PES and a load scaler provided by the PES, wherein the PES provides the plurality of computing nodes that are each configurable to execute one or more programs of multiple users of the PES, the PES further provides a plurality of user-customizable program services, the program services comprising (1) the load balancer configured to allow a user to customize distribution of a workload across multiple computing nodes of the plurality of computing nodes and (2) the load scaler configured to scale computing resources in response to variations in workload;

updating a list of virtualization environments available for selection by users of the PES to provide an updated list of virtualization environments that includes information related to the first virtualization environment;

providing the updated list of virtualization environments to users of the PES;

receiving a selection of the first virtualization environment that is included in the updated list from a second user of the PES; and generating a second virtualization environment for the second user, the second virtualization environment based at least in part on the first virtualization environment.

20. The non-transitory physical computer storage of claim 19, wherein the operations further comprise receiving from the second user at least one change that is to be made to the first virtualization environment, and to generate the second virtualization environment based at least in part on the at least one change.

* * * * *